(12) United States Patent
Rule et al.

(10) Patent No.: US 12,536,392 B2
(45) Date of Patent: Jan. 27, 2026

(54) DEVICES AND METHODS FOR CONTACTLESS CARD ALIGNMENT WITH A FOLDABLE MOBILE DEVICE

(71) Applicant: Capital One Services, LLC, McLean, VA (US)

(72) Inventors: Jeffrey Rule, Chevy Chase, MD (US); Rajko Ilincic, Annandale, VA (US); Colin Hart, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/588,588

(22) Filed: Feb. 27, 2024

(65) Prior Publication Data
US 2024/0242043 A1 Jul. 18, 2024

Related U.S. Application Data

(63) Continuation of application No. 17/492,810, filed on Oct. 4, 2021, now Pat. No. 11,922,254, which is a
(Continued)

(51) Int. Cl.
*G06K 7/10* (2006.01)
*A63F 13/00* (2014.01)
(Continued)

(52) U.S. Cl.
CPC .......... *G06K 7/10366* (2013.01); *A63F 13/00* (2013.01); *A63F 13/20* (2014.09);
(Continued)

(58) Field of Classification Search
CPC .... G06Q 20/341; G06Q 20/352; G06Q 20/34; G06Q 20/3278; H04M 1/0214;
(Continued)

(56) References Cited

U.S. PATENT DOCUMENTS 5,015,830 A * 5/1991 Masuzawa ............. G06K 7/006
235/441
5,590,038 A 12/1996 Pitroda
(Continued)

FOREIGN PATENT DOCUMENTS

CN 101192295 A 6/2008
CN 203278901 U 11/2013
(Continued)

OTHER PUBLICATIONS

Author Unknown, "EMV Integrated Curcuit Card Specifications for Payment Systems, Book 2, Security and Key Management," Version 3.4, [online] 2011 [retrieved on Mar. 25, 2019]. Retrieved from Internet URL: https://www/emvco.com/wp-content/uploads/2017/05/EMV_v4.3_Book_2_Security_and_Key_Management_20120607061923900.pdf, 174 pages.
(Continued)

*Primary Examiner* — Christopher Stanford
(74) *Attorney, Agent, or Firm* — KDW Firm PLLC

(57) ABSTRACT

Example embodiments of systems, methods, and devices for transaction card alignment are provided. In one example embodiment, a mobile device may include a first component and a second component foldable with respect to one another between a first configuration and a second configuration. The mobile device may further include a screen interface on an interior side of the first component, and an alignment feature along the interior side, the alignment feature providing alignment for a contactless card with respect to the screen interface, wherein the contactless card is uncovered by the second component in the first configuration and covered by the second component in the second configuration.

20 Claims, 9 Drawing Sheets

Related U.S. Application Data continuation of application No. 16/565,526, filed on Sep. 10, 2019, now Pat. No. 11,138,395, which is a continuation of application No. 16/367,892, filed on Mar. 28, 2019, now Pat. No. 10,467,445.

(51) Int. Cl.

| | | |
|---|---|---|
| A63F 13/20 | (2014.01) | |
| A63F 13/95 | (2014.01) | |
| G06K 7/00 | (2006.01) | |
| G06K 7/015 | (2006.01) | |
| G06K 19/00 | (2006.01) | |
| G06K 19/07 | (2006.01) | |
| G06Q 20/34 | (2012.01) | |
| H04M 1/02 | (2006.01) | |

(52) U.S. Cl.
CPC ............ *A63F 13/95* (2014.09); *G06K 7/0056* (2013.01); *G06K 7/015* (2013.01); *G06K 7/10316* (2013.01); *G06K 7/10386* (2013.01); *G06K 19/005* (2013.01); *G06K 19/0723* (2013.01); *G06Q 20/34* (2013.01); *G06Q 20/341* (2013.01); *H04M 1/0268* (2013.01)

(58) Field of Classification Search
CPC ......... H04M 1/72412; H04M 2250/04; H04M 1/0268; G06K 19/005; G06K 7/015; G06K 7/10316; G06K 7/10366; G06K 19/0723; G06K 7/0056; G06K 7/10386
See application file for complete search history.

(56) References Cited

U.S. PATENT DOCUMENTS

| | | | |
|---|---|---|---|
| 5,666,415 A | 9/1997 | Kaufman | |
| 6,128,604 A * | 10/2000 | Sakamaki | G06K 7/0013 |
| | | | 379/91.01 |
| 6,199,114 B1 | 3/2001 | White | |
| 6,307,751 B1 * | 10/2001 | Bodony | G06F 1/16 |
| | | | 361/679.08 |
| 6,324,271 B1 | 11/2001 | Sawyer | |
| 6,367,011 B1 | 4/2002 | Lee | |
| 6,572,015 B1 | 6/2003 | Norton | |
| 6,577,496 B1 * | 6/2003 | Gioscia | H04M 1/0216 |
| | | | 455/344 |
| 7,252,242 B2 | 8/2007 | Ho | |
| 7,270,276 B2 | 9/2007 | Vayssiere | |
| 7,287,692 B1 | 10/2007 | Patel | |
| 7,374,099 B2 | 5/2008 | De Jong | |
| 7,527,208 B2 | 5/2009 | Hammad | |
| 7,568,631 B2 | 8/2009 | Gibbs | |
| 7,584,153 B2 | 9/2009 | Brown | |
| 7,628,322 B2 | 12/2009 | Holtmanns | |
| 7,793,851 B2 | 9/2010 | Mullen | |
| 7,801,799 B1 | 9/2010 | Brake, Jr. | |
| 7,908,216 B1 | 3/2011 | Davis | |
| 7,922,082 B2 | 4/2011 | Muscato | |
| 8,010,405 B1 | 8/2011 | Bortolin | |
| 8,074,877 B2 | 12/2011 | Mullen | |
| 8,082,450 B2 | 12/2011 | Frey | |
| 8,108,687 B2 | 1/2012 | Ellis | |
| 8,186,602 B2 | 5/2012 | Itay | |
| 8,196,131 B1 | 6/2012 | Von Behren | |
| 8,249,654 B1 | 8/2012 | Zhu | |
| 8,276,814 B1 | 10/2012 | Davis | |
| 8,332,272 B2 | 12/2012 | Fisher | |
| 8,346,670 B2 | 1/2013 | Hasson | |
| 8,511,547 B2 | 8/2013 | Rans | |
| 8,519,822 B2 | 8/2013 | Riegebauer | |
| 8,750,514 B2 | 6/2014 | Gallo | |
| 8,870,081 B2 | 10/2014 | Olson | |
| 8,977,569 B2 * | 3/2015 | Rao | G06Q 20/341 |
| | | | 705/41 |
| 9,038,893 B2 | 5/2015 | Kirkham | |
| 9,129,199 B2 | 9/2015 | Spodak | |
| 9,183,490 B2 | 11/2015 | Moreton | |
| 9,275,325 B2 | 3/2016 | Newcombe | |
| 9,286,606 B2 | 3/2016 | Diamond | |
| 9,306,753 B1 | 4/2016 | Vandervort | |
| 9,501,776 B2 | 11/2016 | Martin | |
| 9,710,744 B2 | 7/2017 | Wurmfeld | |
| 9,949,065 B1 | 4/2018 | Zarakas | |
| 9,965,632 B2 | 5/2018 | Zarakas | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld | |
| 9,990,795 B2 | 6/2018 | Wurmfeld | |
| 10,007,873 B2 | 6/2018 | Heo | |
| 10,013,693 B2 | 7/2018 | Wyatt | |
| 10,117,079 B2 * | 10/2018 | Ueda | H04W 4/80 |
| 10,121,130 B2 | 11/2018 | Pinski | |
| 10,210,505 B2 | 2/2019 | Zarakas | |
| 10,242,368 B1 | 3/2019 | Poole | |
| 10,269,010 B2 * | 4/2019 | Tunnell | G06Q 20/363 |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,777,933 B2 | 10/2023 | Moreton | |
| 2003/0220876 A1 | 11/2003 | Burger | |
| 2005/0156026 A1 | 7/2005 | Ghosh | |
| 2005/0228997 A1 | 10/2005 | Bicker | |
| 2005/0269402 A1 | 12/2005 | Spitzer | |
| 2007/0276765 A1 | 11/2007 | Hazel | |
| 2008/0082452 A1 | 4/2008 | Wankmueller | |
| 2008/0099552 A1 | 5/2008 | Grillion | |
| 2009/0143104 A1 | 6/2009 | Loh | |
| 2009/0235339 A1 | 9/2009 | Mennes | |

(56) References Cited

U.S. PATENT DOCUMENTS

| | | |
|---|---|---|
| 2009/0282264 A1 | 11/2009 | Amiel |
| 2011/0113245 A1 | 5/2011 | Varadarajan |
| 2011/0155801 A1 | 6/2011 | Rowberry |
| 2012/0143703 A1 | 6/2012 | Wall |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0365377 A1 | 12/2014 | Salama |
| 2015/0032635 A1 | 1/2015 | Guise |
| 2015/0073983 A1 | 3/2015 | Bartenstein |
| 2015/0113271 A1 | 4/2015 | Jooste |
| 2015/0134513 A1 | 5/2015 | Olson |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2016/0078430 A1 | 3/2016 | Douglas |
| 2016/0189143 A1 | 6/2016 | Koeppel |
| 2016/0253651 A1 | 9/2016 | Park |
| 2016/0277383 A1 | 9/2016 | Guyomarc'h |
| 2016/0307189 A1 | 10/2016 | Zarakas |
| 2016/0314472 A1 | 10/2016 | Ashfield |
| 2016/0379217 A1 | 12/2016 | Hammad |
| 2017/0017957 A1 | 1/2017 | Radu |
| 2017/0039566 A1 | 2/2017 | Schipperheijn |
| 2017/0068950 A1 | 3/2017 | Kwon |
| 2017/0330173 A1 | 11/2017 | Woo |
| 2018/0039987 A1 | 2/2018 | Molino |
| 2018/0268132 A1 | 9/2018 | Buer |
| 2018/0300716 A1 | 10/2018 | Carlson |
| 2019/0172055 A1 | 6/2019 | Hale |
| 2019/0303945 A1 | 10/2019 | Mitra |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | | |
|---|---|---|---|
| CN | 204374968 U | 6/2015 | |
| DE | 19851369 C1 * | 6/2000 | ........... A45C 11/182 |
| GB | 2516861 A | 2/2015 | |
| GB | 2551907 A | 1/2018 | |
| JP | 2005354300 A * | 12/2005 | |
| KR | 20150140132 A | 12/2015 | |
| WO | 9910824 A1 | 3/1999 | |
| WO | 0049586 A1 | 8/2000 | |
| WO | 2013155562 A1 | 10/2013 | |
| WO | 2015183818 A1 | 12/2015 | |
| WO | 2017047855 A1 | 3/2017 | |
| WO | 2019022585 A1 | 1/2019 | |
| WO | 2021051884 A1 | 3/2021 | |
| WO | 2021133492 A1 | 7/2021 | |
| WO | 2022108959 A1 | 5/2022 | |
| WO | 2022187350 A1 | 9/2022 | |
| WO | 2023017943 A1 | 2/2023 | |
| WO | 2023064063 A1 | 4/2023 | |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www/computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www/emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security at University of Nijmegen, Netherlands. Retrieved from Internet URL: https://www/cs/ru/nl/E.Poll/teaching/ipa_smartcards.pdf, available on at least Jun. 2, 2019 per Internet Archives, heeps://web.archive.org/, 75 pages.

Emvco: "EMV Card Personalisation Specification", Aug. 1, 2021. pp. 1-114, Retrieved from the Internet: URL: https://emvco.com/specification/?post_id=12467.

Faraj, S.T., et al., "Investigationn of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Sauch: Getting information from an EMV chip card with Java, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullman et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

DEVICES AND METHODS FOR CONTACTLESS CARD ALIGNMENT WITH A FOLDABLE MOBILE DEVICE

CROSS-REFERENCE TO RELATED APPLICATION

This application is a continuation of U.S. Non-Provisional patent application Ser. No. 17/492,810, filed Oct. 4, 2021, which is a continuation of U.S. Non-Provisional patent application Ser. No. 16/565,526 (now U.S. Pat. No. 11,138,395), filed Sep. 10, 2019, which is a continuation of U.S. Non-provisional patent application Ser. No. 16/367,892 (now U.S. Pat. No. 10,467,445), filed Mar. 28, 2019. The contents of the aforementioned applications are incorporated herein by reference in their entirety.

FIELD OF THE DISCLOSURE

The present disclosure relates to user and transaction card authentication, and more particularly, to devices and methods for contactless card alignment with a foldable mobile device.

BACKGROUND

Data security and transaction integrity are of critical importance to businesses and consumers. This need continues to grow as electronic transactions constitute an increasingly large share of commercial activity.

Email may be used as a tool to verify transactions, but email is susceptible to attack and vulnerable to hacking or other unauthorized access. Short message service (SMS) messages may also be used, but that is subject to compromise as well. Moreover, even data encryption algorithms, such as triple data encryption standard (DES) algorithms, have similar vulnerabilities.

While the growing use of chip-based financial/transaction cards provides more secure features over previous technology (e.g., magnetic strip cards) for in-person purchases, account access still may rely on log-in credentials (e.g., username and password) to confirm a cardholder's identity. However, if the log-in credentials are compromised, or the user's transaction card is stolen, another person could have access to the user's account.

These and other deficiencies exist. Accordingly, there is a need to provide users with an appropriate solution that overcomes these deficiencies to provide data security, authentication, and verification for transactions and transaction cards. Further, there is a need for an improved method of card/user authentication for account access.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Embodiments of the present disclosure provide a mobile device including a first component and a second component foldable with respect to one another between a first configuration and a second configuration. The mobile device may further include a screen interface on an interior side of the first component, and an alignment feature along the interior side, the alignment feature providing alignment for a contactless card with respect to the screen interface, wherein the contactless card is uncovered by the second component in the first configuration and covered by the second component in the second configuration.

Embodiments of the present disclosure provide a data transmission system, including a mobile device having a first component and a second component foldable with respect to one another between a first configuration and a second configuration. The data transmission system may further include a screen interface on an interior side of the first component, and an alignment feature along the interior side. The alignment feature provides alignment for a contactless card with respect to the screen interface, wherein the contactless card is uncovered by the second component in the first configuration and covered by the second component in the second configuration. The contactless card may further include a card reader having a processor and memory, wherein the card reader is operable to transmit data with the contactless card when the contactless card is aligned with the screen interface.

Embodiments of the present disclosure provide a method including providing a mobile device operable to transmit data with a contactless card, the mobile device comprising a first component and a second component, wherein the first and second components are foldable with respect to one another between an open configuration and a closed configuration, and wherein the contactless card is covered by the second component in the closed configuration and uncovered by the second component in the open configuration. The method may further include providing an alignment feature along an interior side of the first component, the alignment feature aiding alignment of the contactless card with respect to a screen interface of the first component. The method may further include determining whether the contactless card is aligned on the screen interface, and providing feedback regarding placement of the contactless card based on whether the contactless card is aligned on the screen interface.

BRIEF DESCRIPTION OF THE DRAWINGS

The accompanying drawings illustrate example approaches of the disclosure, including the practical application of the principles thereof, as follows.

Figure 1:
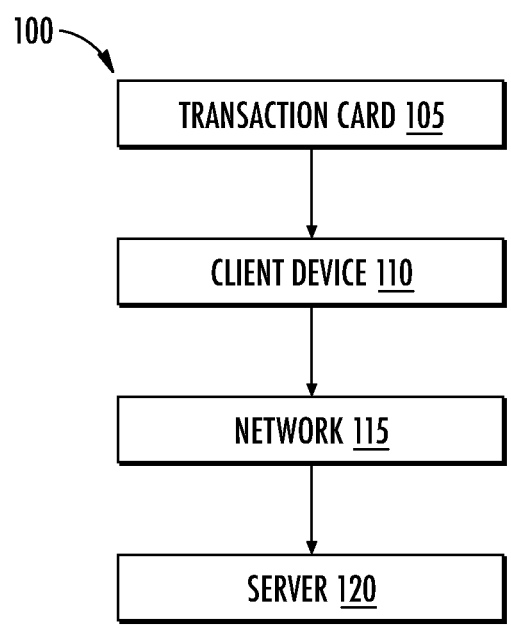
FIG. 1 is a diagram of a system according to an example embodiment.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The following detailed description provides non-limiting representative examples referencing numerals to particularly describe features and teachings of different aspects of the disclosure. The embodiments described should be recognized as capable of implementation separately, or in combination, with other embodiments from the detailed description. A person of ordinary skill in the art reviewing the detailed description should be able to learn and understand the different described aspects of the disclosure. The detailed description should facilitate understanding of the disclosure to such an extent that other implementations, not specifically covered but within the knowledge of a person of skill in the art having read the description of embodiments, would be understood to be consistent with an application of the disclosure.

An objective of some embodiments of the present disclosure is to provide alignment and proper placement of a contactless card within a clamshell or foldable screen phone to optimize the near field communication (NFC) wireless read of the card. Contactless reading of a card by a mobile device is highly dependent on proper placement of the card with respect to the mobile device. In the present disclosure, the mobile device is able to provide feedback on criteria such as time, card placement, and/or signal strength. In various embodiments, the mobile device can operate in either an open or closed configuration, and with either a closed clamshell or foldable screen design. An alignment feature such as a mark or outline may be generated on a screen interface of the mobile device to a suggested placement of the card. Once the contactless card is placed on the screen interface, a readout may be generated to indicate feedback on the card placement. In some embodiments, the mobile device may then initiate data transmission between the card and a card reader when the card is acceptably positioned with respect to the mobile device.

FIG. 1 illustrates a system 100 according to an example embodiment. As further discussed below, the system 100 may include a card 105, a client device 110, a network 115, and a server 120. Although FIG. 1 illustrates single instances of the components, the system 100 may include any number of components.

The system 100 may include one or more contactless transaction cards 105 (hereinafter "card(s)"). The card 105 may be a credit or debit card, an RFID passport, or an access card. Although non-limiting, the card 105 may be made from one or more layers of polyvinyl chloride, polyvinyl chloride acetate, acrylonitrile butadiene styrene, polycarbonate, polyesters, anodized titanium, palladium, gold, carbon, paper, and biodegradable materials. In some examples, the card 105 may have physical characteristics compliant with the ID-1 format of the ISO/IEC 7810 standard, and the card 105 may otherwise be compliant with the ISO/IEC 14443 standard. However, it is understood that the card 105 according to the present disclosure may have different characteristics, and the present disclosure is not limited to any particular card design.

Described herein as contactless due to the method of communication by an identification chip, such as an RFID chip, the card 105 may also provide one or more functions requiring contact. For example, the card 105 may include a conventional magnetic stripe and/or a microchip connected to contacts present on an outer layer of the card 105. In some embodiments, the card 105 may be in wireless communication, utilizing NFC in an example, with the client device 110.

The system 100 may include the client device 110, which may be a network-enabled computer. As referred to herein, a network-enabled computer may include, but is not limited to, a computer device, or communications device including, e.g., a server, a network appliance, a personal computer, a workstation, a phone, a handheld PC, a personal digital assistant, a thin client, a fat client, an Internet browser, or other device. The client device 110 also may be a mobile device, for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In exemplary embodiments, the client device 110 is a configurable mobile device, such as a clamshell-type "flip-phone," or a foldable screen phone.

The client device 110 can include a processor and a memory, and it is understood that the processing circuitry may contain additional components, including, memories, error and parity/CRC checkers, data encoders, anticollision algorithms, controllers, command decoders, security primitives, and tamper proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, microphone, digital camera, video recorder or camcorder. These devices may be used to enter information and interact with the software and other devices described herein.

In some examples, the client device 110 of the system 100 may execute one or more applications, such as software applications, that enable, for example, network communications with one or more components of the system 100 and transmit and/or receive data. The client device 110 may be in communication with one or more servers 120 via one or more networks 115, and may operate as a respective front-end to back-end pair with the server 120. The client device 110 may transmit, for example, from a mobile device application executing on the client device 110, one or more requests to the server 120. The one or more requests may be associated with retrieving data from the server 120. The server 120 may receive the one or more requests from the client device 110. Based on the one or more requests from the client device 110, the server 120 may be configured to retrieve the requested data from one or more databases (not shown). Based on receipt of the requested data from the one or more databases, the server 120 may be configured to transmit the received data to the client device 110, the received data being responsive to one or more requests.

The system 100 may include one or more networks 115. In some examples, the network 115 may be one or more of a wireless network, a wired network or any combination of wireless network and wired network, and may be configured to connect client device 110 to server 120. For example, the network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 115 may include, without limitation, telephone lines, fiber optics, IEEE Ethernet 902.3, a wide area network, a wireless personal area network, a LAN, or a global network such as the Internet. In addition, the network 115 may support an Internet network, a wireless communication network, a cellular network, or the like, or any combination thereof. The network 115 may further include one network, or any number of the exemplary types of networks mentioned above, operating as a stand-alone network or in cooperation with each other. The network 115 may utilize one or more protocols of one or more network elements to which they are communicatively coupled. The network 115 may translate to or from other protocols to one or more protocols of network devices. Although the network 115 is depicted as a single network, it should be appreciated that according to one or more examples, the network 115 may comprise a plurality of interconnected networks, such as, for example, the Internet, a service provider's network, a cable television network, corporate networks, such as credit card association networks, and home networks.

The system 100 may include one or more servers 120. In some examples, the server 120 may include one or more processors, which are coupled to memory. The server 120 may be configured as a central system, server or platform to control and call various data at different times to execute a plurality of workflow actions. The server 120 may be configured to connect to the one or more databases. The server 120 may be connected to at least one client device 110.

Figure 2:
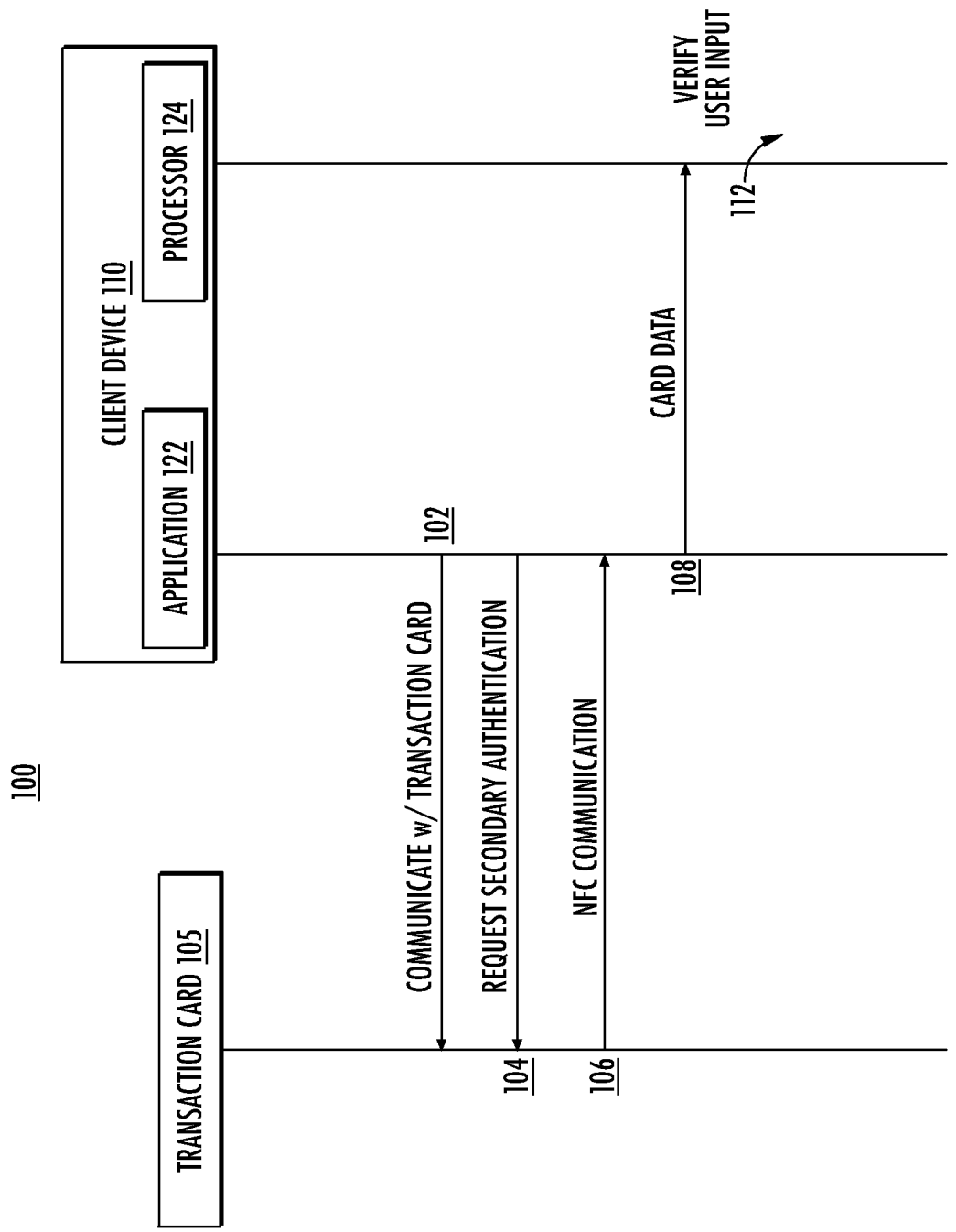
FIG. 2 is a diagram illustrating a sequence for providing authenticated access according to an example embodiment.

FIG. 2 is a timing diagram illustrating an example sequence for providing user/card authentication according to one or more embodiments of the present disclosure. The system 100 may comprise the card 105 and the client device 110, which may include an application 122 and a processor 124. FIG. 2 may reference similar components as illustrated in FIG. 1.

At process 102, the application 122 communicates with the card 105 to receive a primary authentication containing cardholder data in accordance with standard protocols. The primary authentication may be based on communication between the application 122 and the card 105, for example, when the card 105 is used during a transaction recognized by the application 122.

At process 104, the application 122 may request secondary authentication of the card 105. Communication between the application 122 and the card 105 may involve the card 105 being sufficiently close to a card reader (not shown) of the client device 110 to enable NFC data transfer between the application 122 and the card 105, as shown at process 106. In some embodiments, the card 105 is provided in direct physical contact with a screen interface of the client device 110.

At process 108, the application 122 communicates the transaction card data to the processor 124. At process 112, the processor 124 may execute instructions to determine whether to authenticate the transaction based on a comparison between the transaction card data and predetermined identification data.

In some examples, communication with the card 105 may be performed by a device other than the client device 110, such as the server 120 (e.g., as shown in FIG. 1). For example, the processor 124 may output data from the card 105 to the server 120. In some embodiments, the server 120 may verify a transaction and/or user identity by comparing the data received from the card 105 to transaction/user data accessible via the server 120. In other embodiments, the server 120 may verify the card 105 by retrieving an account passcode associated with the card 105, and compare the card data to the account passcode.

Figure 3:
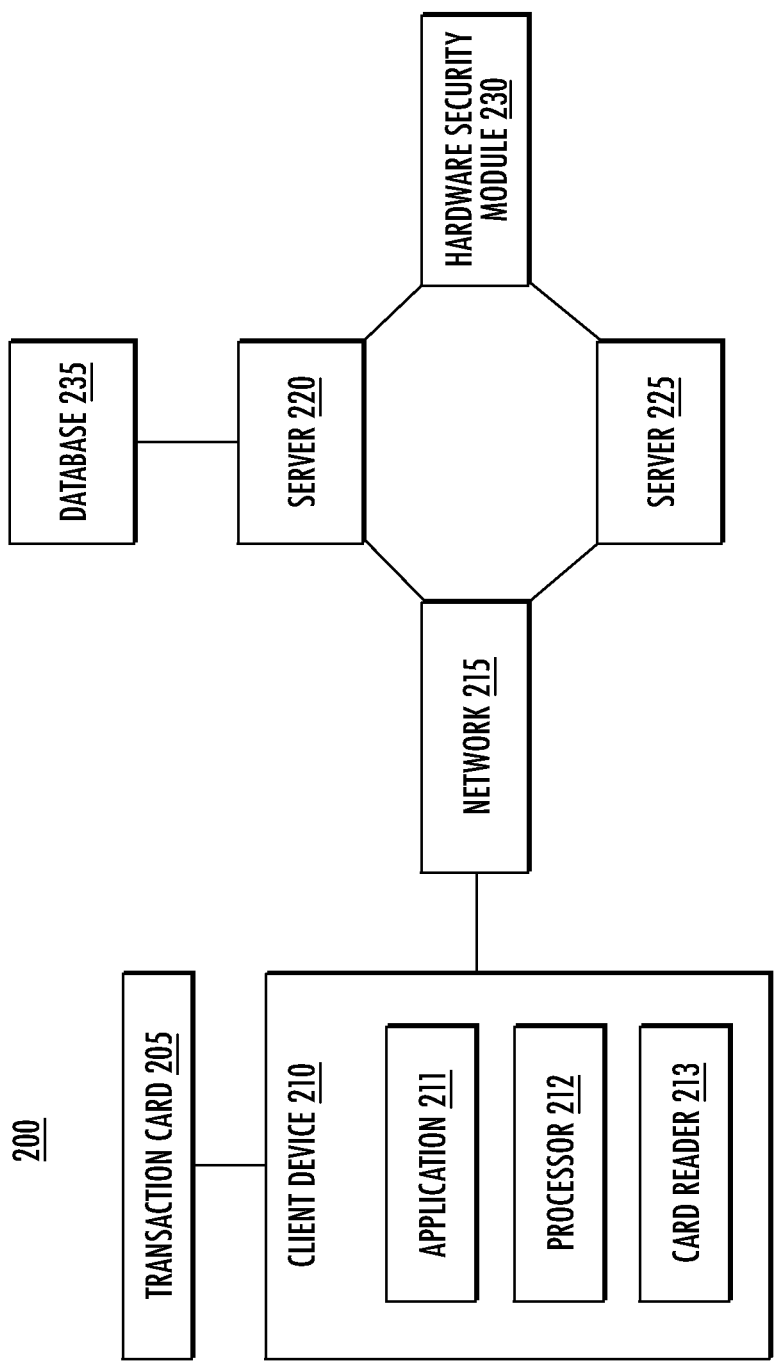
FIG. 3 is a diagram of a system using a transaction card according to an example embodiment.

FIG. 3 illustrates a data transmission system (hereinafter "system") 200 using a card 205, one or more client devices 210, a network 215, servers 220, 225, one or more hardware security modules 230, and a database 235. Although FIG. 3 illustrates single instances of the components, the system 200 may include any number of components.

The system 200 may include one or more cards 205. In some examples, the card 205 may be in wireless communication, for example NFC communication, with the client device 210. The card 205 may comprise one or more chips, such as a radio frequency identification chip, configured to communication via NFC or other short-range protocols. In other embodiments, the card 205 may communicate with the client device 210 through other means including, but not limited to, Bluetooth, satellite, Wi-Fi, wired communications, and/or any combination of wireless and wired connections. According to some embodiments, the card 205 may be configured to communicate with the card reader 213 of the client device 210 through NFC when the card 205 is within range of card reader 213. In other examples, communications with the card 205 may be accomplished through a physical interface, e.g., a universal serial bus interface or a card swipe interface.

The system 200 may include the client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device. A mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, the client device 110 as described with reference to FIG. 1 and FIG. 2.

The client device 210 may be in communication with one or more servers 220 and 225 via one or more networks 215. The client device 210 may transmit, for example from an application 211 executing on the client device 210, one or more requests to one or more servers 220 and 225. The one or more requests may be associated with retrieving data from one or more servers 220 and 225. The servers 220 and 225 may receive the one or more requests from the client device 210. Based on the one or more requests from the client device 210, the one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests. For example, in some non-limiting embodiments, predetermined user data associated with the card 205 and/or an account passcode associated with the card 205 may be retrieved from the one or more databases 235 in response to the requests from the servers 220 and 225.

In some embodiments, the system 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead, are maintained within the HSM 230. For example, one or more HSMs 230 may be configured to perform at least one of key derivations, decryption, and MAC operations. The one or more HSMs 230 may be contained within or may be in data communication with, the servers 220 and 225.

The system 200 may include one or more networks 215. In some examples, the network 215 may be one or more of a wireless network, a wired network or any combination of wireless network and wired network, and may be configured to connect the client device 210 to the servers 220, 225. For example, the network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from the card 205 and the client device 210 may comprise NFC communication, cellular network between the client device 210 and a carrier, and Internet between the carrier and a back-end.

In addition, the network 215 may include, without limitation, telephone lines, fiber optics, IEEE Ethernet 902.3, a wide area network, a wireless personal area network, a local area network, or a global network such as the Internet. In addition, the network 215 may support an Internet network, a wireless communication network, a cellular network, or the like, or any combination thereof. The network 215 may further include one network, or any number of the exemplary types of networks mentioned above, operating as a stand-alone network or in cooperation with each other. The network 215 may utilize one or more protocols of one or more network elements to which they are communicatively coupled. The network 215 may translate to or from other protocols to one or more protocols of network devices. Although the network 215 is depicted as a single network, it should be appreciated that according to one or more examples, the network 215 may comprise a plurality of interconnected networks, such as, for example, the Internet, a service provider's network, a cable television network, corporate networks, such as credit card association networks, and home networks.

In various examples according to the present disclosure, the client device 210 of the system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 3, any number of client devices 210 may be used. The card reader 213 may be configured to read from and/or communicate with the card 205. In conjunction with the one or more applications 211, the card reader 213 may communicate with the card 205.

The application 211 of any of the client devices 210 may communicate with the card 205 using short-range wireless communication (e.g., NFC). The application 211 may be configured to interface with the card reader 213 of the client device 210, which is configured to communicate with the card 205. As should be noted, those skilled in the art would understand that a distance of less than twenty centimeters is consistent with NFC range. As will be described in further detail below, the client device 210 is able to provide feedback on criteria such as time, card placement, and/or signal strength when the card 205 is placed on a screen interface of the client device 210.

The server 220 may be a web server in communication with the database 235. The server 225 may include an account server. In some examples, the server 220 may be configured to validate one or more credentials from the card 205 and/or client device 210 based on a comparison to one or more credentials in database 235. The server 225 may be configured to authorize one or more requests, such as a payment transaction, from the card 205 and/or client device 210 based on this comparison.

Figure 4A:
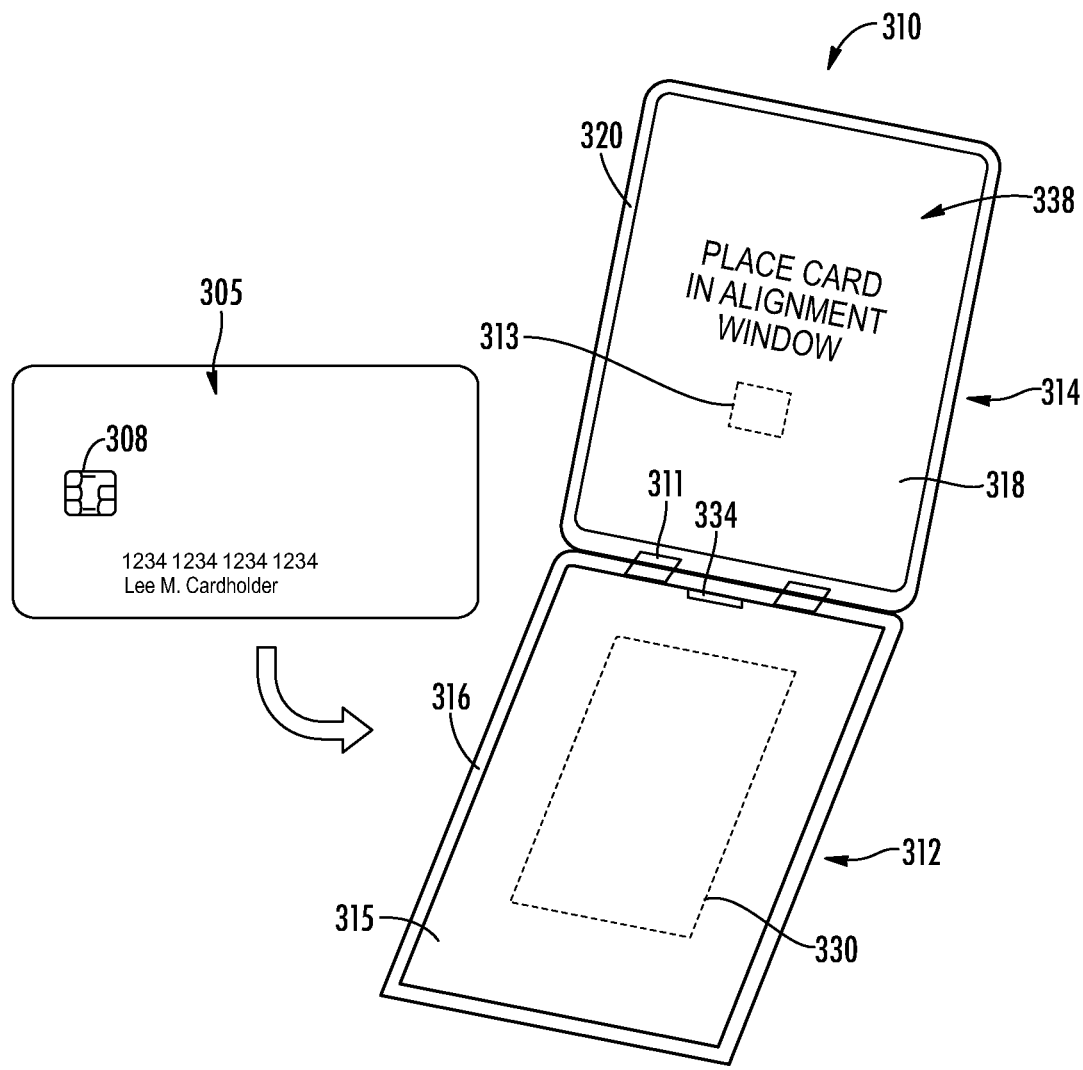
FIGS. 4A-4B are perspective views of a mobile device using a transaction card according to an example embodiment.
Figure 4B:
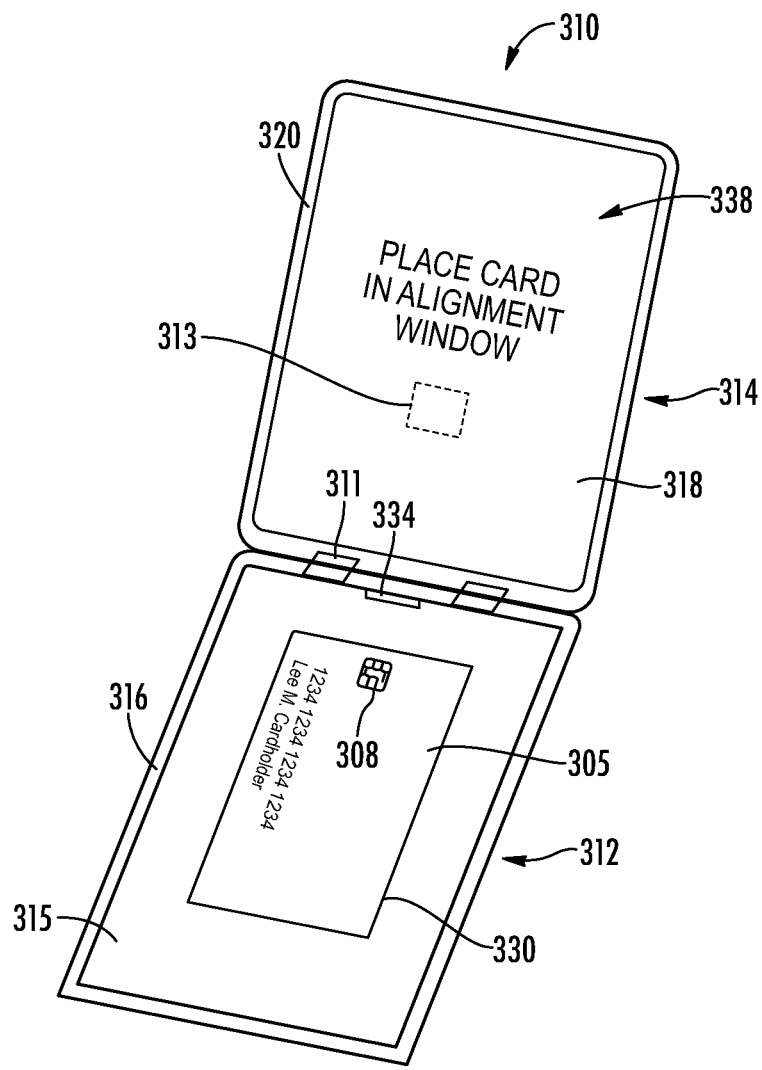

FIGS. 4A-4B illustrate an example card 305, which may be a payment card, such as a credit card, debit card, or gift card, issued by a service provider, in operation with a client device 310. In the embodiment shown, the client device 310 is a hinged, foldable mobile device. For example, the client device 310 may include a first component 312 and a second component 314 foldable with respect to one another between a first configuration (e.g., open) and a second configuration (e.g., closed). Although non-limiting, a set of hinges 311 may permit the first and second components 312, 314 to be rotatably coupled. The client device 310 may include a first screen interface 315 disposed along an interior side 316 of the first component 312, and a second screen interface 318 disposed along an interior side 320 of the second component 314. Optionally, the client device 310 may include a third screen interface 355 (FIG. 5A) disposed along an exterior side of the first or second components 312, 314.

One or more of the first screen interface 315, the second screen interface 318, and the third screen interface 355 may be a touch screen interface. That is, the screen interface is a display capable of monitoring changes in electrical current. For example, the first screen interface 315, the second screen interface 318, and the third screen interface 355 may each be a capacitive touch screen having a layer of capacitive material to hold an electrical charge, wherein touching the screen changes the amount of charge at a specific point of contact. In other embodiments, one or more of the screen interfaces may include a resistive screen, wherein pressure from a finger causes conductive and resistive layers of circuitry to touch each other, thus changing the circuits' resistance. Others interfaces may monitor changes in the reflection of waves, such as sound waves or beams of near-infrared light. Yet other interfaces may use transducers to measure changes in vibration caused when an object, such as a finger or stylus, hits the screen's surface or may use one or more cameras to monitor changes in light and shadow.

In some embodiments, the card 305 may include an identification chip 308 coupled (e.g., recessed or partially embedded) to a surface thereof. As used herein, the identification chip 308 may be any microprocessor device configured to exchange data electromagnetically, such as an RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies. Although not shown, the card 305 may further include a magnetic stripe on an opposite side.

As described above, the card 305 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader of the client device 310, such as a mobile NFC reader, and produce an NDEF message that comprises a cryptographically secure OTP encoded as an NDEF text tag.

Furthermore, the card 305 and a card reader 313 interact with each other to exchange information. In some embodiments, both the card 305 and the card reader 313 include one or more NFC communication devices, such as an antenna. Information and data can be exchanged between the antennae in a peer-to-peer (P2P) communication mode or a reader/writer (R/W) communication mode. In the P2P communication mode, the card 305 may be configured to operate according to an active communication mode and/or a passive communication mode.

As will be described further below, the card 305 is sufficiently proximate to the card reader such that information communication is inductively coupled onto the antenna of the card reader 313. The card reader 313 may demodulate the information communicated to recover the information. The card reader may respond to the information by modulating its corresponding information onto a second carrier wave and generating a second magnetic field by applying this modulated information communication to the antenna to provide a second modulated information communication in the active communication mode. Alternatively, the card reader may respond to the information by modulating its antenna with corresponding information to modulate a first carrier wave to provide the second modulated information communication in the passive communication mode. In some embodiments, the card 305 derives or harvests power from the client device 310 to recover, to process, and/or to provide a response to the information.

As further shown in FIGS. 4A-4B, the client device 310 may include an alignment feature 330 generated via the first screen interface 315 of the first component 312. The alignment feature 330 provides alignment for the card 305 with respect to the first screen interface 318, thereby positioning the card 305 in close proximity to the card reader 313 of the client device 310. The card reader 313 may be a component embedded within the first and/or second components 312, 314. As will be described in greater detail below, the card 305 may be uncovered by the second component 314 when the client device 310 is in a first, open configuration, and covered by the second component 314 when the client device 310 is in a second, closed configuration.

In some embodiments, the alignment feature 330 may be a visual indicator displayed via the first screen interface 315. For example, as shown, the alignment feature 330 may be an alignment window generally corresponding to the shape of the card 305. However, the alignment feature 330 may take on virtually any shape, configuration, color, etc. In yet other embodiments, the client device 310 may include one or more physical alignment features, such as an abutment 334 extending from at least one of the first component 312 or the second component 314. Rather than aligning the card 305 in the middle of the first screen interface 315, a user may simply slide the card 305 along the first screen interface 315 until it meets the abutment 334. This may be especially useful in the case the card 305 may be inserted into the client device 310 when the first and second components 312, 314 are in the second, closed position.

As further shown in FIG. 4A, the second screen interface 318 may display a prompt 338 inviting the user to position the card 305 atop the first screen interface 315. Once the card 305 is brought into position on the first screen interface 315, as shown in FIG. 4B, the client device 310 may be closed.

Figure 5A:
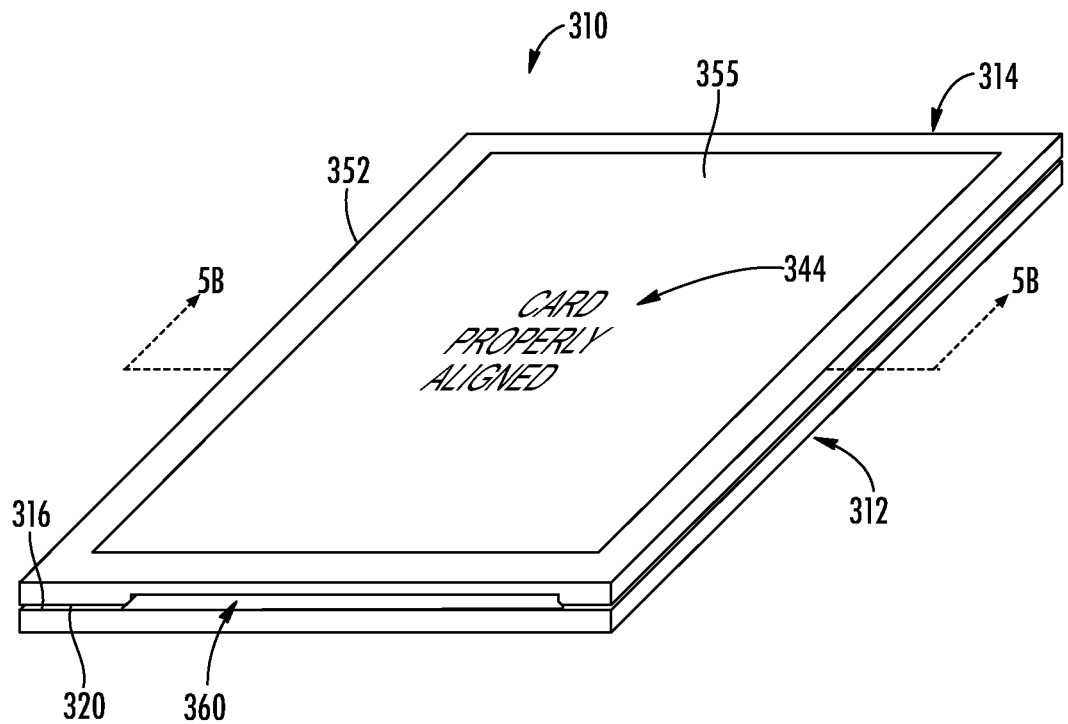
FIG. 5A is a perspective view of a mobile device operable with a transaction card according to an example embodiment.
Figure 5B:
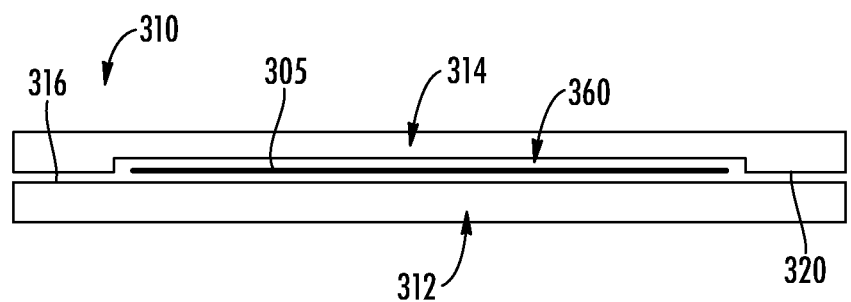
FIG. 5B is an end cross-sectional view of the mobile device and transaction card of FIG. 5A according to an example embodiment.

FIGS. 5A-5B illustrate the card 305 and the client device 310 in the second, closed configuration. As shown, the first component 312 and the second component 314 are rotatably coupled together such that the interior side 316 of the first component 312 and the interior side 320 of the second component 314 are brought into abutment with one another to sandwich the card 305 therebetween. Shown along the exterior side 352 of the second component 314 is the optional third screen interface 355. In some embodiments, feedback may be provided to the user via the third screen interface 355 when the client device 310 is in the second, closed position. The third screen interface 355 may provide feedback 344 on criteria such as time, card placement, and/or signal strength when the card 305 is placed between the first and second components 312, 314. Additionally, the third screen interface 355 may generate and display a prompt inviting the user to position the card 305 between the between the first and second components 312, 314.

As shown, the feedback 344 may be a textual and/or graphical message indicating whether the card is properly aligned. If the card 305 is deemed not to be properly aligned, the feedback 344 may indicate how the card can be repositioned (e.g., move the card up/down, right/left, etc.). If the card is 305 is properly aligned, the feedback 344 may instruct the user to proceed. In yet another example, the third screen interface 355 may provide feedback to the user regarding signal strength. A textual and/or graphical message may indicate a signal strength, wherein a predetermined NFC signal strength threshold may need to be achieved before the card 305 is read by the card reader 313. If the signal strength is below the threshold, the feedback 344 may indicate ways to increase the signal, such as repositioning the card.

In some embodiments, the client device 310 may include a slot 360 recessed into the first and/or second components 312, 314. The slot 360 further aids with the alignment of the card 305, and may permit the card 305 to be inserted between the first and second components 312, 314 while the client device 310 is in the second, closed position. In some embodiments, the card 305 will only be read when the client device 310 is in the second, closed position. For example, the card 305 may require close physical proximity of both the first and second components 312, 314 to initiate data transmission. That is, closing the second component 314 brings the reader into <2 cm contact with the card reader 313. The closing of the client device 310 may lock the card 305 into position for optimal reading. In other embodiments, the card 305 can be read when the client device 310 is in the first, open position when the card 305 is in proper alignment along the first component 312 and the card reader 313 is located in the first component 312.

Figure 6:
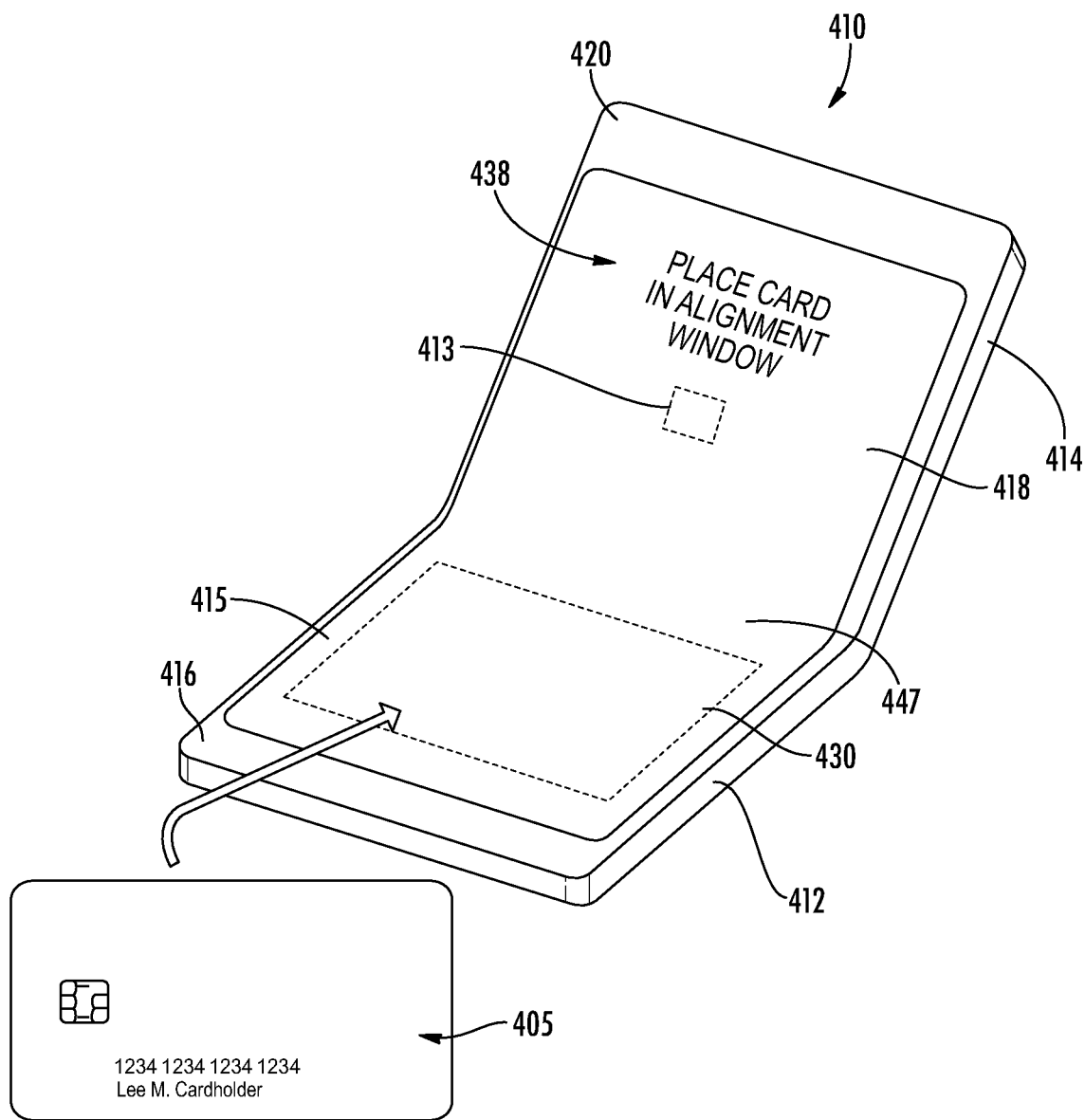
FIG. 6 is a perspective view of a mobile device operable with a transaction card according to an example embodiment.

FIG. 6 illustrates an example client device 410 operable with a card 405, which may be a payment card, such as a credit card, debit card, or gift card, issued by a service provider. In the embodiment shown, the client device 410 is a foldable smartphone with a flexible screen. However, the client device 410 may alternatively be a tablet computer, a personal digital assistant, a media player, an e-book reader, or a display. As shown, the client device 410 may include a first portion 412 and a second portion 414 foldable with respect to one another between a first configuration (e.g., open, flat) and a second configuration (e.g., closed). Although non-limiting, the first and second portions 412, 414 may be foldable/rotatable about a fold position 447, which may extend across the client device 410. Although not shown, the fold position 447 may be the result of corresponding mechanical components within the client device 410. The fold position 447 may divide the client device 410 into a first screen interface 415 disposed along an interior side 416 of the first portion 412, and a second screen interface 418 disposed along an interior side 420 of the second portion 414. Optionally, the client device 410 may include a third screen interface (not shown) disposed along an exterior side of the first and/or second portions 412, 414.

As shown, the first and second screen interfaces 415, 418 may be part of a single, continuous screen interface extending across the first portion 412 and the second portion 414. In an example embodiment, the first and second screen interfaces 415, 418 combine to provide a touch sensitive display including a touch sensor for detecting the touch of the user on or in proximity thereof. The touch sensor may include a resistive, a surface acoustic wave, a capacitive (e.g., a surface capacitance), a projected capacitance, a mutual capacitance, or self-capacitance (e.g., an infrared), an optical, a dispersive signal and/or acoustic pulse recognition touch sensor or an array thereof.

The first and second screen interfaces 415, 418 can be made of plastic, thin glass, thin metal or elastomer. In some embodiments, first and second screen interfaces 415, 418 may include resilient materials, such as a gel, an elastomer, foam, rubber or silicone or other resilient structures such as hollow, woven, folded or coiled structures, or a folding membrane of e.g. thin polymer of fabric. In the first configuration, the first and second screen interfaces 415, 418 may be substantially planar with one another. In the second configuration, the interior side 416 of the first portion 412 and the interior side 420 of the second portion 414 may be brought into contact/and or in close proximity to one another.

Furthermore, the card 405 and a card reader 413 interact with each other to exchange information. In some embodiments, both the card 405 and the card reader 413 include one or more NFC communication devices, such as an antenna. Information and data can be exchanged between the antennae in a peer-to-peer (P2P) communication mode or a reader/writer (R/W) communication mode. In the P2P communication mode, the card 405 may be configured to operate according to an active communication mode and/or a passive communication mode.

When the client device 410 is in the second, closed position, the card 405 is sufficiently proximate to the card reader such that information communication is inductively coupled onto the antenna of the card reader 413. The card reader 413 may demodulate the information communicated to recover the information. The card reader may respond to the information by modulating its corresponding information onto a second carrier wave and generating a second magnetic field by applying this modulated information communication to the antenna to provide a second modulated information communication in the active communication mode. Alternatively, the card reader may respond to the information by modulating its antenna with corresponding information to modulate a first carrier wave to provide the second modulated information communication in the passive communication mode. In some embodiments, the card 405 derives or harvests power from the client device 410 to recover, to process, and/or to provide a response to the information.

As further shown in FIG. 6, the client device 410 may include an alignment feature 430 generated via the first screen interface 415 of the first portion 412. The alignment feature 430 provides alignment for the card 405 with respect to the first screen interface 412, thereby positioning the card 405 in close proximity to the card reader 413 of the client device 410 when the second portion 414 is closed. In the embodiment shown, the card reader 413 may be embedded within the second portion 414.

As further shown in FIG. 6, the second screen interface 418 may display a prompt 438 inviting the user to position the card 405 atop the first screen interface 415. Once the card 405 is brought into position on the first screen interface 415, the client device 410 may be closed to initiate communication between the card reader 413 and the card 405.

Figure 7:
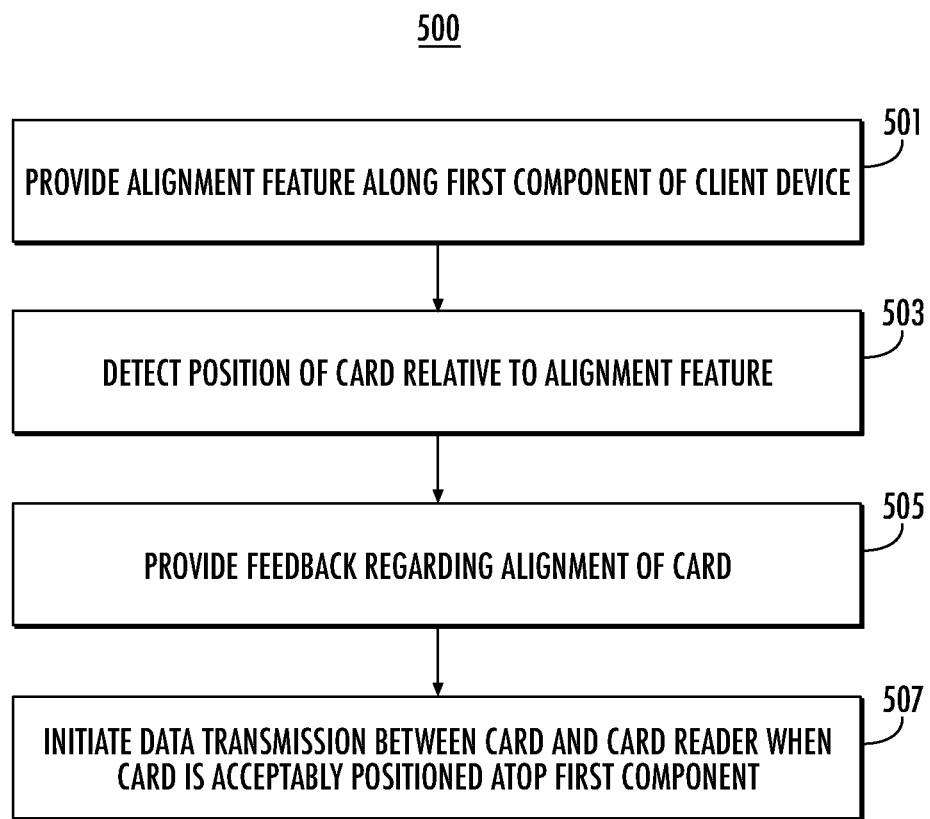
FIG. 7 is a flowchart illustrating a method for transaction card alignment on a mobile device according to an example embodiment.

FIG. 7 is a flowchart illustrating a method 500 according to an example embodiment. The method 500 will be described with reference to the client device 310 and card 305 of FIGS. 4A-5B. As shown, at block 501, the method 500 may include providing the alignment feature 330 along the first component 312 of the client device 310. At block 503, the method 500 may include detecting a position of the card 305 relative to the alignment feature 330 to determine the alignment of the card 305 relative to the card reader 313. At block 505, the method 500 may include providing feedback regarding the alignment of the card 305. In the case the card 305 is acceptably positioned atop the first component 312, the feedback 344 displayed via the first, second, and/or third screen interfaces may indicate as such. In the case the card 305 is not acceptably positioned atop the first component 312, the feedback 344 may indicate ways for adjusting the card 305. At block 507, the method 500 may then include initiating data transmission between the card 305 and the card reader 313 when the card 305 is acceptably positioned atop the first component 312. In some embodiments, data transmission between the card 305 and the card reader 313 is only initiated when card alignment has been achieved and the client device 310 is in the second, closed position.

Figure 8:
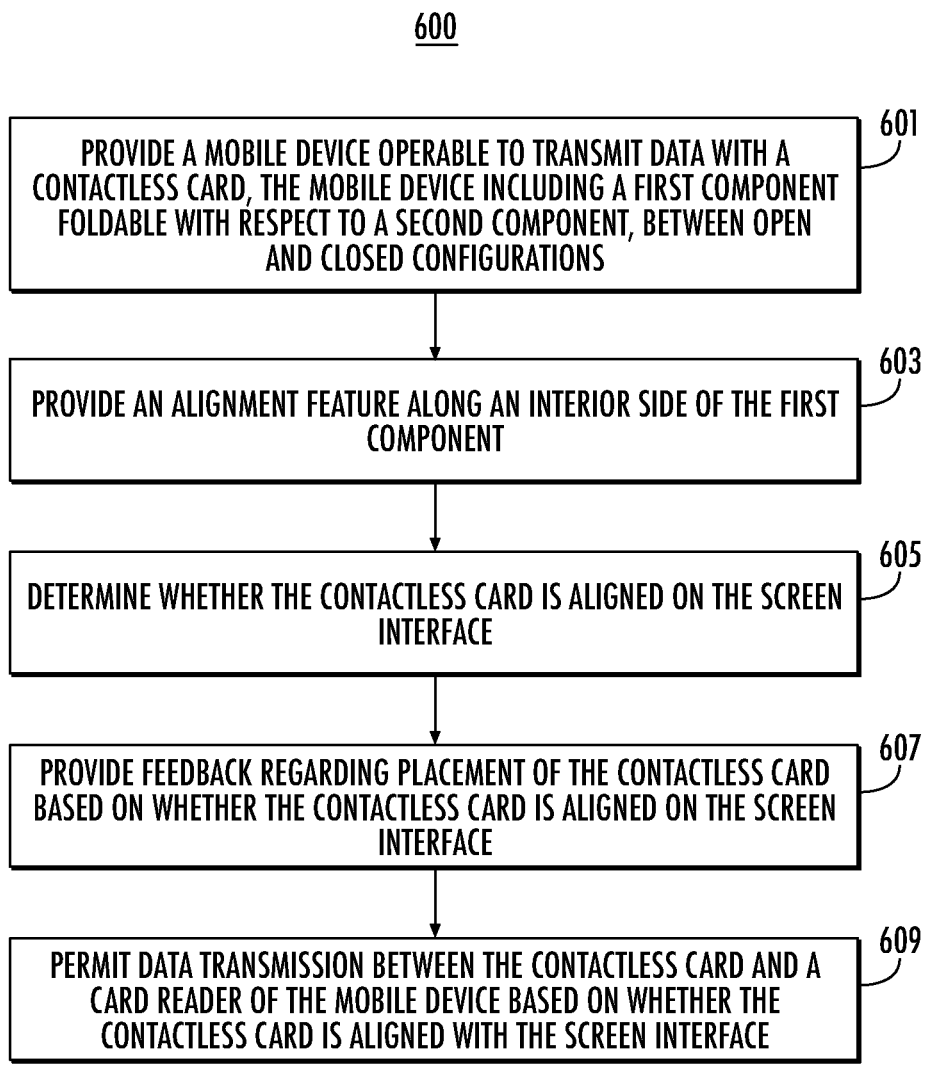
FIG. 8 is a flowchart illustrating a method for transaction card alignment on a mobile device according to an example embodiment.

FIG. 8 is a flowchart illustrating a method 600 according to an example embodiment. At block 601, the method 600 may include providing a mobile device operable to transmit data with a contactless card, the mobile device including a first component foldable with respect to a second component, between open and closed configurations. In some embodiments, the contactless card is covered by the second component in the closed configuration and uncovered by the second component in the open configuration. In some embodiments, the mobile device is a clamshell-type phone or a foldable screen phone. In some embodiments, the client device is a foldable smartphone with one or more flexible screens. In some embodiments, the mobile device has multiple screen interfaces. In some embodiments, the screen interfaces may be touch screen capable. In some embodiments, the contactless card may be a transaction card, such as a debit and/or credit card, capable of NFC communication. In some embodiments, a slot is recessed into at least one of the first component and the second component, wherein the contactless card may be received through the slot when the first and second components are in the closed configuration.

At block 603, the method 600 may further include providing an alignment feature along with an interior side of the first component. The alignment feature aids alignment of the contactless card with respect to a screen interface of the first component. In some embodiments, the alignment feature is a visual indicator, such as a dotted alignment window generally corresponding to the shape of the contactless card. In some embodiments, the alignment feature is generated and displayed via the first screen interface. In other embodiments, the alignment feature may be an abutment extending from at least one of the first component and the second component.

At block 605, the method 600 may include determining whether the contactless card is aligned on the screen interface. At block 607, the method 600 may include providing feedback regarding placement of the contactless card based on whether the contactless card is aligned on the screen interface. In some embodiments, the feedback is provided via the second screen interface disposed along an interior side of the second component. In some embodiments, the second screen interface displays feedback on criteria such as time, card placement, and/or signal strength. Other types of feedback may also be provided to the user.

At block 609, the method 600 may further include permitting data transmission between the contactless card and a card reader of the mobile device based on whether the contactless card is aligned with the screen interface. In some embodiments, the method may include determining a configuration change of the first and second components from the open configuration to the closed configuration and then initiating data transmission between the contactless card and the card reader of the mobile device in response to the configuration change of the first and second components. For example, data transmission may not be permitted or possible unless the first and second components are in the closed configuration.

In some examples, the transaction card can selectively communicate information depending upon the recipient device. Once the user input is received, the transaction card can recognize the device to which the input is directed, and based on this recognition the transaction card can provide appropriate data for that device. This advantageously allows the transaction card to transmit only the information required to complete the instant action or transaction, such as a payment or card authentication. By limiting the transmission of data and avoiding the transmission of unnecessary data, both efficiency and data security can be improved. The recognition and selective communication of information can be applied to various scenarios, including card activation, balance transfers, account access attempts, commercial transactions, etc., as a way to reduce fraud.

If the transaction card input is directed to a device running Apple's iOS® operating system, e.g., an iPhone, iPod, or iPad, the transaction card can recognize the iOS® operating system and transmit data appropriate data to communicate with this device. For example, the transaction card can provide the encrypted identity information necessary to authenticate the card using NDEF tags via, e.g., NFC. Similarly, if the transaction card input is directed to a device running the Android® operating system, e.g., an Android® smartphone or tablet, the transaction card can recognize the Android® operating system and transmit appropriate and data to communicate with this device (such as the encrypted identity information necessary for authentication by the methods described herein).

As another example, the transaction card input can be directed to a POS device, including without limitation a kiosk, a checkout register, a payment station, or another terminal. Upon proper alignment of the transaction card, the transaction card can recognize the POS device and transmit only the information necessary for the action or transaction. For example, upon recognition of a POS device used to complete a commercial transaction, the transaction card can communicate payment information necessary to complete the transaction under the EMV standard.

In some examples, the POS devices participating in the transaction can require or specify additional information, e.g., device-specific information, location-specific information, and transaction-specific information, that is to be provided by the transaction card. For example, once the POS device receives a data communication from the transaction card, the POS device can recognize the transaction card and request the additional information necessary to complete an action or transaction, such as a sequence input to the overlay via the indicia.

In some examples, data may be collected on user input behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the transaction card.

Although the illustrative methods 500 and 600 are described as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be necessary to implement a methodology in accordance with the present disclosure.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile device, comprising:
    a first component and a second component foldable with respect to one another and having an open configuration and a closed configuration, the closed configuration having a slot recessed between an interior surface of the first component and the second component;
    an exterior screen interface on the exterior surface; and
    a card reader operable to communicate data with a contactless card,
    the slot to receive the contactless card and align the contactless card along an interior screen interface while the first and second components are in the closed configuration, the exterior screen interface to provide feedback about alignment of the contactless card with respect to the card reader while the contactless card is in the slot.

2. The mobile device of claim 1, the exterior screen interface, coupled with an exterior of the first component or the second component, to display feedback related to alignment of the contactless card.

3. The mobile device of claim 2, the exterior screen interface operable to display how to move the contactless card with respect to the interior screen interface to align the contactless card with the card reader.

4. The mobile device of claim 2, wherein at least one of the interior screen interface and the exterior screen interface is a capacitive touch screen interface.

5. The mobile device of claim 2, the exterior screen interface to display time, card placement, signal strength, or a combination thereof, based on the feedback.

6. The mobile device of claim 1, wherein the first component is rotatably coupled with the second component, and wherein the contactless card is sandwiched between the first component and the second component when the second component is in the closed configuration.

7. The mobile device of claim 1, further comprising an alignment feature displayed as a visual indicator via the interior screen interface while the first component and the second component are in the open configuration.

8. The mobile device of claim 1, further comprising an alignment feature that includes an abutment extending from at least one of the first component and the second component.

9. The mobile device of claim 1, wherein the card reader is disposed within at least one of: the first component and the second component.

10. A data transmission system, comprising:
    a mobile device comprising:
        a first component and a second component foldable with respect to one another between a first configuration and a second configuration, the second configuration having a slot recessed between an interior surface of the first component and the second component;
        a screen interface on an interior side of the first component; and
        an alignment feature along the interior side, the alignment feature providing alignment for a contactless card with respect to the screen interface,
        the slot to align the contactless card with the screen interface in the second configuration and
    a card reader having a processor and memory, the data transmission system to provide power to the contactless card in the second configuration while the contactless card is in the slot and proximate to the card reader.

11. The data transmission system of claim 10, further comprising an exterior screen interface, coupled with an exterior of the first component or the second component, to display feedback related to alignment of the contactless card.

12. The data transmission system of claim 11, the exterior screen interface operable to display how to move the contactless card with respect to the screen interface to align the contactless card with the card reader.

13. The data transmission system of claim 11, wherein at least one of the screen interface and the exterior screen interface is a capacitive touch screen interface.

14. The data transmission system of claim 11, the exterior screen interface to display time, card placement, signal strength, or a combination thereof, based on the feedback.

15. The data transmission system of claim 10, wherein the alignment feature comprises an abutment extending from at least one of the first component and the second component, the abutment operable to engage the contactless card.

16. A method comprising:
providing a mobile device operable to transmit data with a contactless card, the mobile device comprising a first component and a second component, wherein the first and second components are foldable with respect to one another between an open configuration and a closed configuration, and wherein the contactless card is covered by the second component in the closed configuration and uncovered by the second component in the open configuration;
providing a slot recessed into at least one of: the first component and the second component;
receiving the contactless card through the slot when the first and second components are in the closed configuration;
providing an alignment feature along an interior side of the first component, the alignment feature aiding alignment of the contactless card with respect to an interior screen interface of the first component;
determining whether the contactless card is aligned on the interior screen interface; and
providing feedback on an exterior screen interface regarding placement of the contactless card based on whether the contactless card is aligned on the interior screen interface.

17. The method of claim 16, further comprising performing data transmission between the contactless card and a card reader of the mobile device while the contactless card is proximate to an antenna of the card reader.

18. The method of claim 17, further comprising:
determining a configuration change of the first and second components from the open configuration to the closed configuration; and
initiating data transmission between the contactless card and the card reader of the mobile device in response to the configuration change of the first and second components.

19. The method of claim 16, further comprising visibly displaying the alignment feature via the interior screen interface while the mobile device is in the open configuration.

20. The method of claim 16, the exterior screen interface, coupled with an exterior of the first component or the second component, to display feedback related to alignment of the contactless card in the closed configuration.

* * * * *